(12) United States Patent
Chen (10) Patent No.: US 9,623,613 B2
(45) Date of Patent: Apr. 18, 2017

(54) PLASTIC BAGS

(71) Applicant: Chih-Hung Chen, Roselle, IL (US)

(72) Inventor: Chih-Hung Chen, Roselle, IL (US)

( * ) Notice: Subject to any disclaimer, the term of this patent is extended or adjusted under 35 U.S.C. 154(b) by 0 days.

(21) Appl. No.: 14/211,532

(22) Filed: Mar. 14, 2014

(65) Prior Publication Data

US 2015/0259103 A1      Sep. 17, 2015

(51) Int. Cl.
| | |
|---|---|
| *B29D 5/10* | (2006.01) |
| *B65D 75/68* | (2006.01) |
| *B65D 33/25* | (2006.01) |
| *B29C 47/00* | (2006.01) |
| *B29C 47/06* | (2006.01) |
| *B29C 47/88* | (2006.01) |
| *B29L 5/00* | (2006.01) |
| *B29L 31/00* | (2006.01) |

(52) U.S. Cl.
CPC ............ *B29D 5/10* (2013.01); *B29C 47/0021* (2013.01); *B29C 47/0026* (2013.01); *B29C 47/0061* (2013.01); *B29C 47/064* (2013.01); *B29C 47/8835* (2013.01); *B65D 33/2508* (2013.01); *B65D 75/68* (2013.01); *B29K 2023/06* (2013.01); *B29L 2005/00* (2013.01); *B29L 2031/7128* (2013.01)

(58) Field of Classification Search
CPC .............. B65D 33/2541; B65D 33/007; B65D 33/2533; B65D 33/20; B65D 33/255; B65D 75/68; B65D 33/2508; B29D 5/10; B29C 47/0021; B29C 47/0026; B29C 47/0061; B29C 47/64; B29C 47/8835; B29K 2023/06; B29L 2005/00; B29L 2031/7128

USPC ......................................... 383/63, 66, 207, 35
See application file for complete search history.

(56) References Cited

U.S. PATENT DOCUMENTS

| | | | | | |
|---|---|---|---|---|---|
| 3,323,707 | A | * | 6/1967 | King .................. | B65D 75/5805 383/200 |
| 3,346,883 | A | * | 10/1967 | Ersek ................. | A61B 10/0038 383/11 |
| 3,369,267 | A | * | 2/1968 | Friedland ................ | A47L 23/05 15/104.94 |
| 3,406,853 | A | * | 10/1968 | McLeod ................. | A61J 9/001 215/11.3 |
| 3,535,409 | A | * | 10/1970 | Rohde ................. | B29C 37/0057 264/171.28 |
| 3,565,147 | A | * | 2/1971 | Ausnit .................... | B29D 5/10 383/119 |
| 3,715,420 | A | * | 2/1973 | Kiyono ................. | B29C 47/046 264/173.19 |
| 3,827,472 | A | * | 8/1974 | Uramoto ............ | B65D 33/2541 383/107 |

(Continued)

*Primary Examiner* — Peter Helvey
(74) *Attorney, Agent, or Firm* — Anova Law Group, PLLC (57) ABSTRACT

A plastic bag is provided. The plastic bag includes a first wall made of a first material with a first thickness dimension and a second wall made of the first material with a second thickness dimension, wherein an opening is formed on a first side of the first wall and the second wall and a second side of the first wall and the second wall is sealed together. The plastic bag also includes a first strip made of a second material with a third thickness dimension disposed on the first wall. The plastic bag further includes a first section on the first wall having a fourth thickness dimension. The fourth thickness dimension is smaller than the first thickness dimension. The first strip and the first section align to form a first weakened zone.

12 Claims, 11 Drawing Sheets

(56) References Cited

U.S. PATENT DOCUMENTS

| | | | | |
|---|---|---|---|---|
| 3,942,634 A * | 3/1976 | Gandi | A61B 19/026 | 206/205 |
| 3,979,050 A * | 9/1976 | Cilia | B65D 33/002 | 206/390 |
| 4,363,345 A * | 12/1982 | Scheibner | B65D 33/2508 | 24/585.12 |
| 4,488,918 A * | 12/1984 | Jofs | B29C 47/0023 | 156/244.24 |
| 4,562,023 A * | 12/1985 | Pabst | B29C 47/0021 | 264/173.18 |
| D285,412 S * | 9/1986 | Harwell, Jr. | D9/707 | |
| 4,753,766 A * | 6/1988 | Pinsolle | B29C 47/0019 | 264/174.1 |
| D297,306 S * | 8/1988 | King | D9/709 | |
| 4,840,824 A * | 6/1989 | Davis | A47G 27/06 | 264/173.17 |
| 4,903,841 A * | 2/1990 | Ohsima | B65D 75/5805 | 229/237 |
| 4,904,092 A * | 2/1990 | Campbell | B65D 33/001 | 206/390 |
| 5,000,500 A * | 3/1991 | Almog | E01H 1/1206 | 15/257.1 |
| 5,056,930 A * | 10/1991 | Mestetsky | B65D 33/20 | 383/40 |
| 5,092,684 A * | 3/1992 | Weeks | B65D 33/2533 | 383/61.2 |
| 5,102,234 A * | 4/1992 | Levy | A61B 10/0096 | 383/209 |
| 5,121,997 A * | 6/1992 | La Pierre | B29C 47/0019 | 383/203 |
| 5,135,313 A * | 8/1992 | Bowman | B65D 33/34 | 229/70 |
| RE34,117 E * | 10/1992 | Martin | B29C 66/004 | 383/38 |
| 5,167,454 A * | 12/1992 | Woods | B65D 33/007 | 264/177.1 |
| 5,186,543 A * | 2/1993 | Cochran | B65D 75/5805 | 383/203 |
| 5,209,574 A * | 5/1993 | Tilman | B65D 33/2541 | 24/DIG. 50 |
| 5,308,666 A * | 5/1994 | Borchardt | C08L 23/06 | 383/116 |
| D349,451 S * | 8/1994 | Sagnard | D9/703 | |
| 5,366,294 A * | 11/1994 | Wirth | B31B 19/90 | 156/66 |
| 5,382,094 A * | 1/1995 | Ausnit | B29C 47/003 | 383/35 |
| D363,018 S * | 10/1995 | Stokes | D9/709 | |
| 5,527,112 A * | 6/1996 | Dais | B65D 33/20 | 383/211 |
| 5,552,202 A * | 9/1996 | May | B65D 33/2533 | 383/204 |
| 5,672,009 A * | 9/1997 | Malin | B31B 19/90 | 24/DIG. 50 |
| 5,747,126 A * | 5/1998 | Van Erden | B65D 33/255 | 24/585.12 |
| 5,804,112 A * | 9/1998 | Greene | B29C 47/0026 | 264/173.12 |
| 5,863,130 A * | 1/1999 | Nguyen | B65D 33/001 | 206/554 |
| 5,893,645 A * | 4/1999 | May | B65D 33/2516 | 383/208 |
| 5,894,947 A * | 4/1999 | Morano | A61J 9/001 | 215/11.3 |
| D421,307 S * | 2/2000 | Harmanoglu | D24/118 | |
| D429,459 S * | 8/2000 | Berman | D9/707 | |
| D432,907 S * | 10/2000 | Hyde | D9/703 | |
| 6,135,281 A * | 10/2000 | Simhaee | B65B 43/123 | 206/390 |
| 6,149,302 A * | 11/2000 | Taheri | B65D 33/2541 | 383/203 |
| 6,154,934 A * | 12/2000 | Matthews | B65D 33/2541 | 24/304 |
| 6,217,216 B1 * | 4/2001 | Taheri | B29C 47/0023 | 383/207 |
| 6,391,353 B1 * | 5/2002 | Marbler | B65D 75/38 | 383/111 |
| D476,225 S * | 6/2003 | De La Garza | D9/707 | |
| 6,575,627 B2 * | 6/2003 | Huseman | B65D 33/20 | 383/37 |
| 6,716,296 B2 * | 4/2004 | Chum | B65D 33/001 | 156/290 |
| 6,913,388 B2 * | 7/2005 | Laske | B65D 31/02 | 383/107 |
| 6,955,466 B1 * | 10/2005 | Soderholm | B65D 27/08 | 229/309 |
| D541,669 S * | 5/2007 | Pokusa | D9/709 | |
| D552,482 S * | 10/2007 | Lin | D9/703 | |
| 7,381,357 B2 * | 6/2008 | Cramer | B29C 47/0021 | 264/173.16 |
| D586,232 S * | 2/2009 | Friebe | D9/707 | |
| 7,540,072 B2 * | 6/2009 | Anzini | A44B 19/16 | 24/399 |
| 7,651,271 B2 * | 1/2010 | Withers | B65D 33/007 | 24/30.5 R |
| 7,793,391 B2 * | 9/2010 | Sprehe | A61J 9/001 | 24/399 |
| D634,645 S * | 3/2011 | LaFauci | D9/707 | |
| 7,950,851 B2 * | 5/2011 | Taheri | B65D 75/58 | 383/63 |
| D642,069 S * | 7/2011 | LaFauci | D9/707 | |
| 8,297,841 B2 * | 10/2012 | Bosman | B32B 1/08 | 229/87.05 |
| D676,762 S * | 2/2013 | LaFauci | D9/703 | |
| 8,389,596 B2 * | 3/2013 | Boyce | B65D 75/5805 | 522/103 |
| 8,398,306 B2 * | 3/2013 | Kinigakis | B65D 33/20 | 383/203 |
| 8,469,592 B2 * | 6/2013 | Pawloski | B65D 33/255 | 383/63 |
| D688,564 S * | 8/2013 | LaFauci | D9/703 | |
| D691,491 S * | 10/2013 | Tucker | D9/703 | |
| 8,568,031 B2 * | 10/2013 | Price | B65D 33/255 | 24/400 |
| D694,651 S * | 12/2013 | Sam | D9/709 | |
| 8,979,367 B2 * | 3/2015 | Tan | B65D 33/001 | 206/554 |
| 2003/0077007 A1 * | 4/2003 | Turvey | B65D 33/007 | 383/33 |
| 2003/0138171 A1 * | 7/2003 | Kikuchi | B65D 33/2541 | 383/63 |
| 2003/0217943 A1 * | 11/2003 | Sklar | A61B 10/0096 | 206/438 |
| 2004/0013323 A1 * | 1/2004 | Withers | B65D 33/007 | 383/63 |
| 2004/0184681 A1 * | 9/2004 | Arnell | B65D 33/2591 | 383/64 |
| 2004/0184682 A1 * | 9/2004 | Lovold | B65D 33/007 | 383/120 |
| 2004/0234171 A1 * | 11/2004 | Dais | B29C 47/0021 | 383/61.2 |
| 2005/0031232 A1 * | 2/2005 | Jammet | B31B 19/20 | 383/200 |
| 2008/0285896 A1 * | 11/2008 | Taheri | B65D 75/58 | 383/200 |
| 2011/0211777 A1 * | 9/2011 | Gerbault | B65D 33/2533 | 383/63 |
| 2011/0249919 A1 * | 10/2011 | Shepard | B65D 31/10 | 383/203 |
| 2011/0311168 A1 * | 12/2011 | Pawloski | B65D 33/24 | 383/63 |
| 2011/0311169 A1 * | 12/2011 | Smith | B65D 33/255 | 383/63 |
| 2012/0180434 A1 * | 7/2012 | Snyder | A45C 5/00 | 53/469 |
| 2012/0195526 A1 * | 8/2012 | Moehlenbrock | B65D 33/20 | 383/42 |

(56) References Cited

U.S. PATENT DOCUMENTS

| | | | |
|---|---|---|---|
| 2013/0236129 A1* | 9/2013 | Pawloski | B65D 33/24 383/63 |
| 2014/0093192 A1* | 4/2014 | Dais | B65D 33/28 383/65 |
| 2015/0139571 A1* | 5/2015 | Tseng | B65D 33/002 383/35 |

* cited by examiner

PLASTIC BAGS

FIELD OF INVENTION

This invention relates generally to plastic bags and, more particularly, to plastic bags with a tear-to-open feature.

BACKGROUND

In laboratories, operation rooms and food processing facilities, workers who are wearing protective gloves may have difficulty in opening a sealed plastic bag with or without re-closable zipper feature. The workers may prefer opening a plastic bag without using both hands to pull open a sealed re-closable zipper or conventional bag with seal or using any sharp tool to cut open a sealed bag. Regular consumers may also prefer opening a sealed plastic bag without using any cutting tool.

Re-closable bags have long history of development and currently, mainly three different types of process are used to manufacture the re-closable bags. A blown film process with zipper profiles extruded together with main film web was first described in U.S. Pat. No. 3,338,284 to Ausnit, U.S. Pat. No. 3,852,386 to Behr, and U.S. Pat. No. Re. 29,208 to Naito. A second approach is a zipper attached process. In this process, zipper profile was extruded separately either pre-cooled or in line and then attached with pre-extruded film or laminated film using thermal method or adhesive technology. This process can be seen in U.S. Pat. Nos. 3,226,787 and 4,101,355 to Ausnit, U.S. Pat. No. 3,846,209 to Howard; U.S. Pat. No. 3,904,468 to Noguchi, U.S. Pat. No. 4,279,677 to Takahashi, and U.S. Pat. No. 4,582,549 to Ferrell. Another approach is a casting process with zipper profile extruded together with the web and has been described in U.S. Pat. No. 3,462,332 to Goto, U.S. Pat. No. 4,295,919 by Sutrina, U.S. Pat. No. 4,306,924 and U.S. Pat. No. 4,428,788 to Kamp, U.S. Pat. No. 4,522,678 to Zieke, and U.S. Pat. No. 4,555,282 to Yano.

Laminated sheet was proposed by Flor and Lucchetti in U.S. Pat. No. 3,075,857 using a polypropylene sheet as substrate coated with a polyvinyl alcohol layer to provide oxygen and moisture barrier properties and a binder layer. More laminates between polymeric sheet and metal using binders were disclosed in U.S. Pat. Nos. 3,481,812, 3,663, 334 and 3,669,797. Laminates between two polymeric sheets using binders were also disclosed in U.S. Pat. Nos. 3,607,616, 3,697,368, 3,922,473 and 4,163,080.

There are different methods to create easy tear strip on a polymeric bag. A popular one is to use a notch or a cut line on the seal edge of a bag made by laminated film which contains at least one biaxial oriented film on the laminated film. For a single layer polymeric bag, a pre-cut short line or notch or a perforation line is widely used to create an easy to tear feature. However, a notch or a pre-cut short line on the seal edge of a single layer polymeric bag cannot provide a straight tear line and the perforation line on a bag may not provide contamination protection to the content inside the bag. Rohde described a tear strip for envelop and polymeric bag using a coextruded color band of different material in U.S. Pat. Nos. 3,535,409 and 3,368,740. However, the colored tear strip has no bonding force with either side of the main bag body since they are formed by different material and the main bag body was disconnected by the tear strip section. The film made by this method has no mechanical strength to adhere its color strips with either side of the main bag body and are not practical.

In recent year, Taheri described a process of making a thin section on the main polymeric bag body to provide a weak and easy tear zone in U.S. Pat. Nos. 6,149,302 and 6,217,216 B1. In this process, Taheri described that the thin section creates a stress difference and tends to have film web wrinkle problem and needs to add at least one, preferably two, polymeric strips to provide added weight and strength to reduce the lateral forces acting in the thin section. These stabilizing strips can be used to define the tear zone. The wrinkle problem created by the thin section was reduced after adding two polymeric strips. However, the wrinkle and the difficulty to wind still exist and generate waste and other production problems.

The disclosed plastic bags are directed at solving one or more problems set forth above and other problems.

BRIEF SUMMARY OF THE DISCLOSURE

One aspect of present disclosure provides a plastic bag. The plastic bag includes a first wall made of a first material with a first thickness dimension and a second wall made of a first material with a second thickness dimension, wherein an opening is formed on a first side of the first wall and the second wall and a second side of the first wall and the second wall is sealed together. The plastic bag also includes a first strip made of a second material with a third thickness dimension disposed on the first wall. The plastic bag further includes a first section on the first wall having a fourth thickness dimension. The fourth thickness dimension is smaller than the first thickness dimension. The first strip and the first section align to form a first weakened zone.

Another aspect of present disclosure provides a process of making a plastic bag. The process includes the steps of providing a first molten material and forming a web from the first molten material. The process also includes disposing a second molten material on the web to form a first strip. A first thinning section on the web is formed where the first strip is disposed, and a first weakened zone is formed where the second strip and the second thinning section are disposed.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
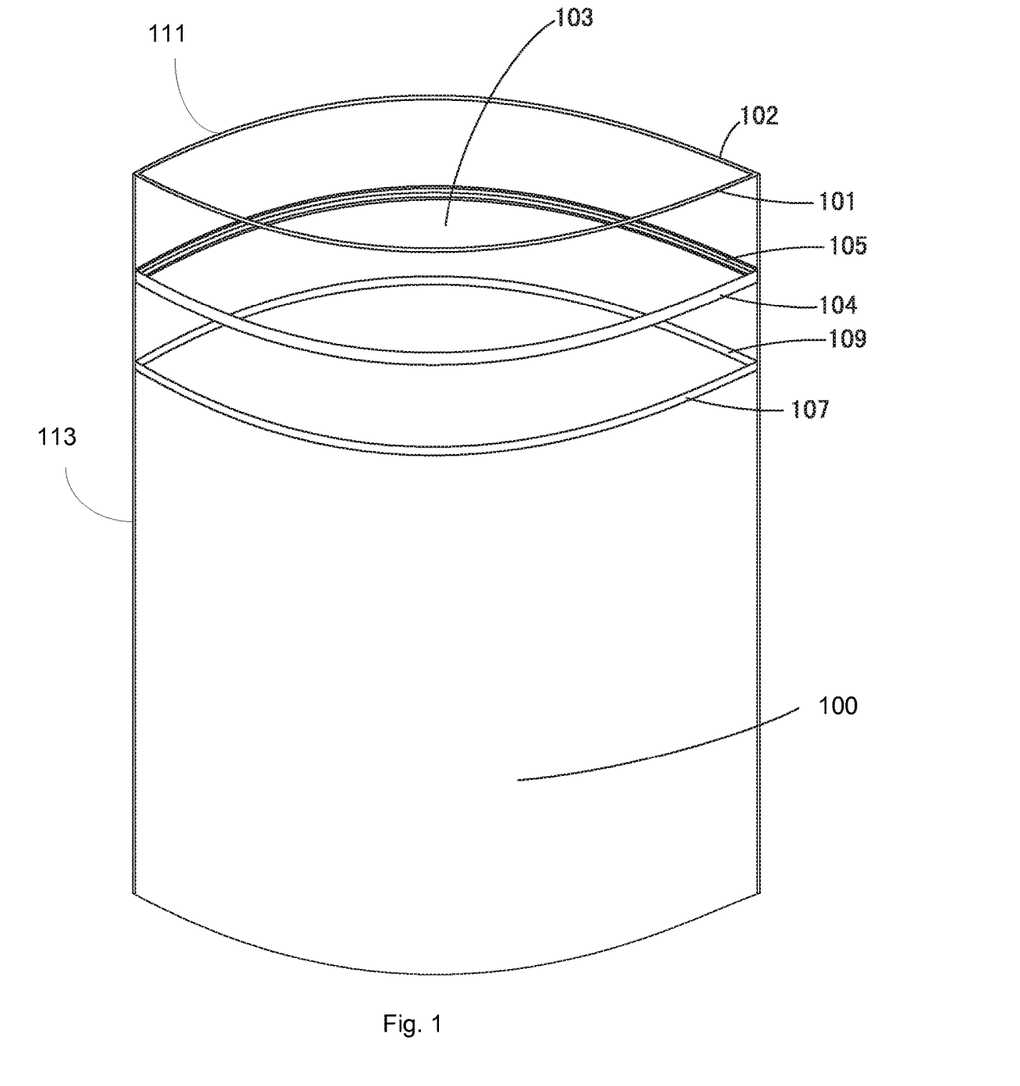
FIG. 1 illustrates an exemplary plastic bag consistent with the disclosed embodiments.

FIG. 1 illustrates an exemplary plastic bag 100 consistent with the disclosed embodiments. As shown in FIG. 1, the bag 100 includes a first wall 101 and a second wall 102. The bag 100 may include a male zipper profile 104 and a female zipper profile 105. A first strip 107 may be disposed on the first wall 101 and a second strip 109 may be disposed on the second wall 102. In certain embodiments, the bag may a first side 111 and a second side 113. The first wall 101 and the second wall 102 may be sealed together at the second side 113. An opening 103 may be formed at the first side 111 of the bag 100. In certain embodiments, the bag 100 may be in a shape of a rectangle. The bag 100 may also be in any other appropriate shape.

Figure 2:
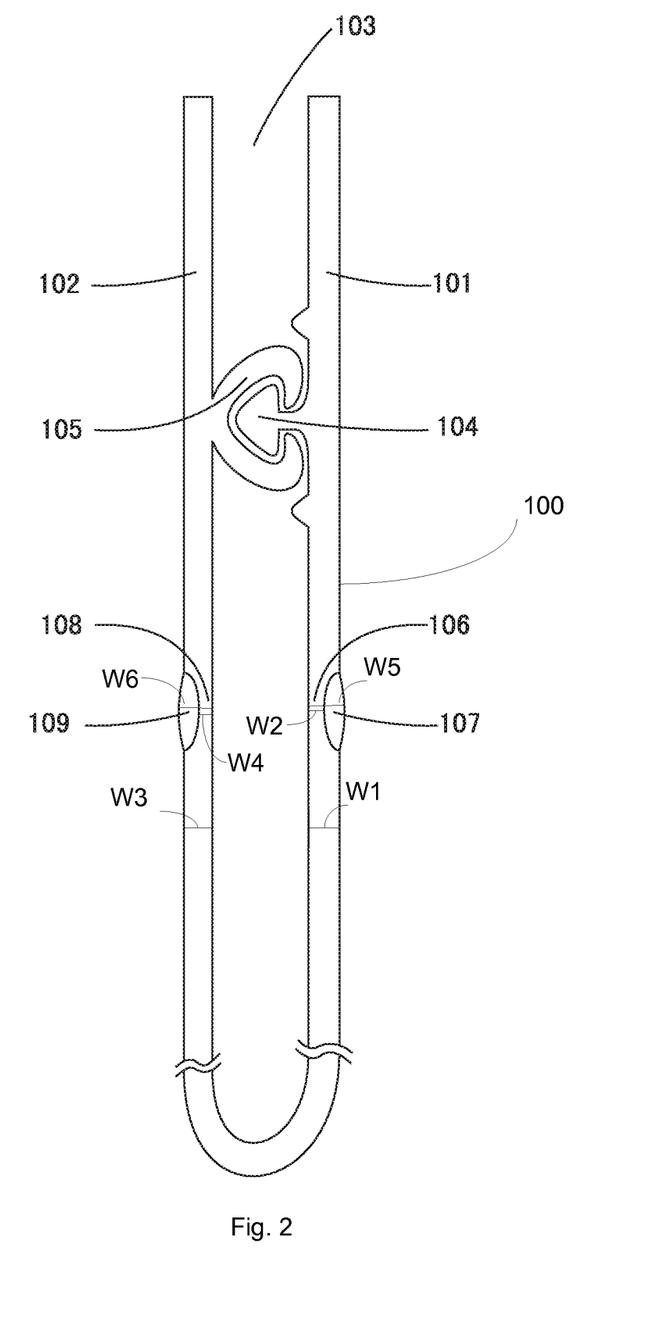
FIG. 2 illustrates a cross section view of an exemplary plastic bag consistent with the disclosed embodiments.

FIG. 2 illustrates a cross section view of an exemplary plastic bag 100 consistent with the disclosed embodiments. As shown in FIG. 2, the plastic bag 100 may include the first wall 101, the second wall 102, the opening 103, the male zipper profile 104, the female zipper profile 105, the first strip 107, the second strip 109, a first section 106, and a second section 108. The wall 101 and the wall 102 may be made of a film of a material that is suitable for making plastic bag. In certain embodiment, the film may be made of an appropriate polymeric material, such as polyethylene. The film may also be made of any other appropriate materials.

The first section 106 may be a thinning portion on the wall 101. As shown in FIG. 2, the wall 101 may have a thickness dimension W1 and the section 106 may have a thickness dimension W2. W2 may be generally smaller than W1. The first strip 107 may be attached to the first section 106. In certain embodiment, the first strip 107 may be disposed at the outside of the first section 106. The first strip 107 may also be disposed at the inside of the first section 106. The second section 108 may be a thinning portion on the wall 102. As shown in FIG. 2, the wall 102 may have a thickness dimension W3 and the section 108 may have a thickness dimension W4. W4 may be generally smaller than W3. The second strip 109 may be attached to the second section 108. In certain embodiment, the second strip 109 may be disposed at the outside of the second section 108. The second strip 109 may also be disposed at the inside of the second section 108. The thickness dimension W1 and W3 may or may not be the same and the thickness dimension W2 and W4 may be the same or may be different.

The first strip 107 and the second strip 109 may be made of any appropriate materials. In certain embodiments, the first strip 107 and the second strip 109 may be made of any appropriate polymeric materials, such as polyethylene. The first strip 107 and the second strip 109 may also be made of any other appropriate materials. The first strip 107 may be made of the same material as the second strip 109. The first strip 107 may also be made of different material as the second strip 109. The first strip 107 may made of the same material as the first wall 101. The first strip 107 may also be made of different material as the first wall 101. The second strip 109 may be made of the same material as the second wall 102. The second strip 109 may also be made of different material as the second wall 102.

The first section 106 and the first string 107 may form a section that has a thickness dimension W5. In certain embodiments, W5 is substantially similar to W1. Thus, the wall 101 with the first string 107 may have substantially uniform thickness overall. Similarly, a thickness dimension W6 at the section with the second section 108 and the second string 109 may be substantially similar to W3 and the wall 102 with the second string 109 may have may have substantially uniform thickness overall. Therefore, the film that forms the wall 101 and wall 102 may be manufactured like normal film without wrinkles or mechanical failure during bag forming process.

The first strip 107 and the first section 106 are attached by a bonding force. The bonding force is generally weaker compared to the force within the material of the wall 101. In certain embodiments, the first strip 107 and the first section 106 may be made of the same polymeric material. Within the wall 101, the first section 106, and the first strip 107, the molecules of the polymeric material interlink with each other to form a relatively stronger bond. However, between the first strip 107 and the first section 106, the bonding is weaker because the first strip 107 and the first section 106 are not kneaded together. That is, the polymeric molecules in the first strip 107 do not mix well with those in the first section 106. Thus, the link between the molecules in the first strip 107 and those in the first section 106 is weaker compared to the link between the molecules within the first strip 107 and/or the first section 106. In certain embodiments, the first strip 107 and the first section 106 may be made of different materials. Similarly, the bonding between the first strip 107 and the first section 106 is weaker compared to the bonding force with the first strip 107 and/or the first section 106.

In addition, the first section 106 is relatively weaker compared to other area of the wall 101. Thus, a first weakened tear zone is formed at the first strip 107/first section 106. Similarly, a second weakened tear zone if formed at the second strip 109/second section 108. In certain embodiments, the first weakened zone and the second weakened zone align. That is, the first weakened zone and the second weakened zone may have similar distance to the first side 111.

When an excess force, such as excess pulling, tearing or snapping force, is applied to the bag, the first string 107 may be delaminated from the wall 101, leaving the thinning and weakened first section 106. The first section 106 may serve as an easy tear strip for the wall 101. Similarly, a thinning and weakened section 108 may serve as an easy tear strip for the wall 102. When a force is applied to the bag, the weakened zone may break before other area of the bag. The breakage may propagate along the weakened zone formed by the first strip 107 and the first section 106 and/or the second strip 109 and/or the second section 108. The bag 100 may then be torn open. The bag 100 may thus be open by the excess force along the strip line 107 and/or 109.

To identify the strips 107 and/or 109, the strips 107 and/or 109 may be in a color that is different to the walls 101 and/or 102. The strips 107 and/or 109 may be colored by any appropriate method. In certain embodiments, an appropriate dye may be added in to material that makes the strips 107 and/or 109.

In certain embodiments, the plastic bag 100 may include more than one strip 107 and corresponding section 106 on the first wall 101. Each strip 107 and the corresponding section 106 may have the same thickness. Each strip 107 and the corresponding section 106 may also have different thickness. The plastic bag 100 may also include more than one strip 109 and corresponding section 108 on the second wall 102. Each strip 109 and the corresponding section 108 may have the same thickness. Each strip 109 and the corresponding section 108 may also have different thickness. Thus, the wall 101 and/or the wall 102 may include more than one weakened zone.

Figure 3:
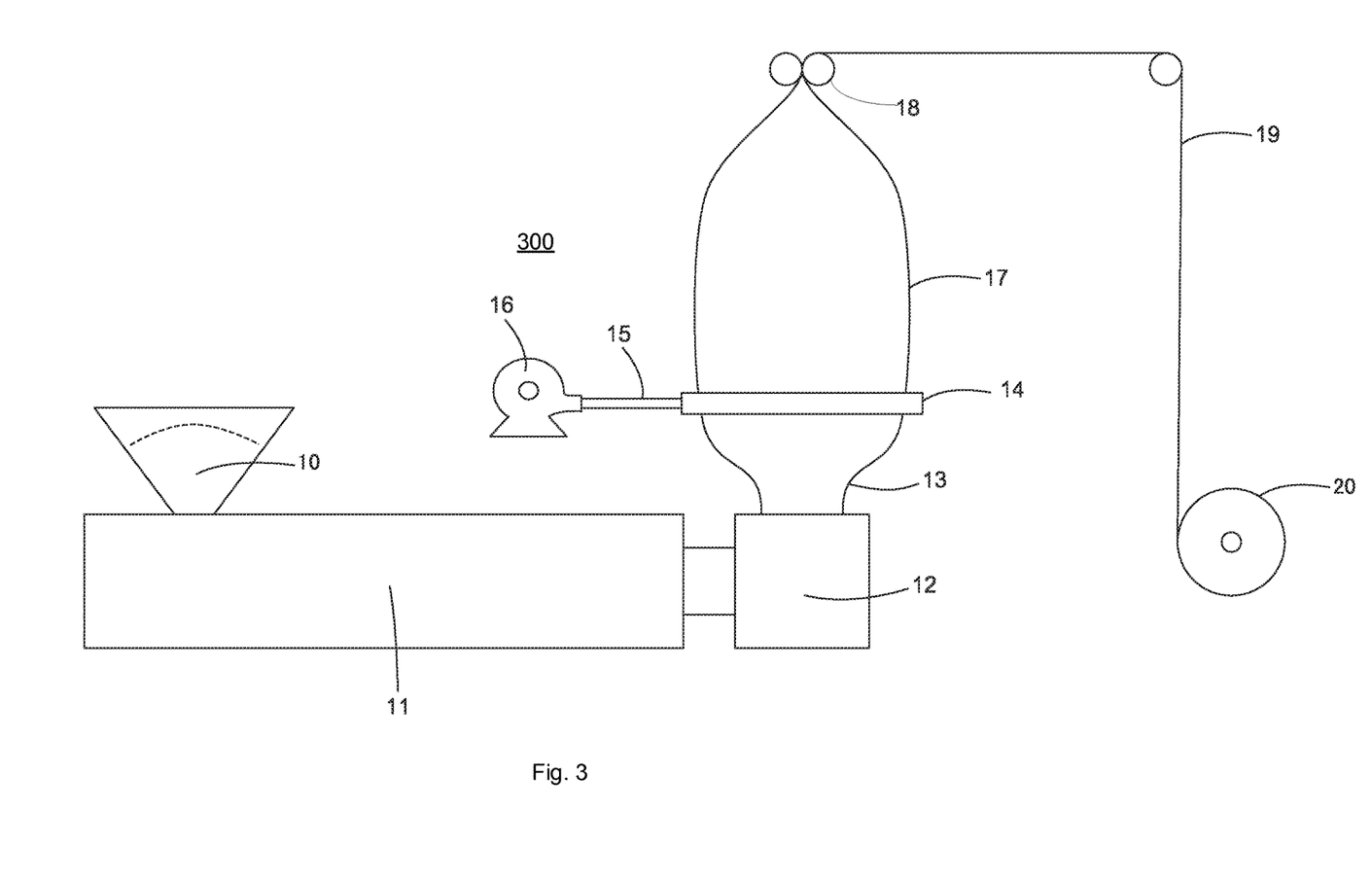
FIG. 3 illustrates an exemplary blown film device consistent with the disclosed embodiments.

FIG. 3 illustrates an exemplary blown film device 300 consistent with the disclosed embodiments. As shown in FIG. 3, the device 300 includes a hopper 10, an extruder 11, a die 12, an air ring 14, an air supply hose 15, an air blower 16, and a winder 20. To make a plastic bag, an appropriate material may be first charged into the hopper 10. The materials are heated in extruder 11 to melt. The materials are then extruded from the extruder 11. Molten materials are passed through the die 12 to form a molten polymeric tube 13. In certain embodiments, the die 12 is in a circular shape. The die 12 may also be in any other appropriate shape. In certain embodiments, the polymeric tube 13 may be in a circular shape. The tube 13 may also be in any other appropriate shape.

The molten tube 13 may be cooled in the air ring 14. In certain embodiments, the air ring 14 may be in a circular shape. The air ring 14 may also be in any other appropriate shape. The air ring 14 receives air from the hose 15. The air blower 16 may blow the air into the air ring 14 through the hose 15 to cool the molten tube 13. The tube 13 becomes a web 17 after cooling in the air ring 14. In certain embodiments, a cross section of the web 17 may be in the shape of a circle. The web 17 may also be in other appropriate shape. The web 17 may be collapsed into a flat web 19 after passing the pressing member 18. The pressing member 18 may squeeze the air out of the web 17. In certain embodiments, the pressing member 18 may be a roller. The collapsed web 19 may be collected on the winder 20. The web 19 collected on the winder 20 may be opened, cut, and sealed into the individual bag 100.

Figure 4:
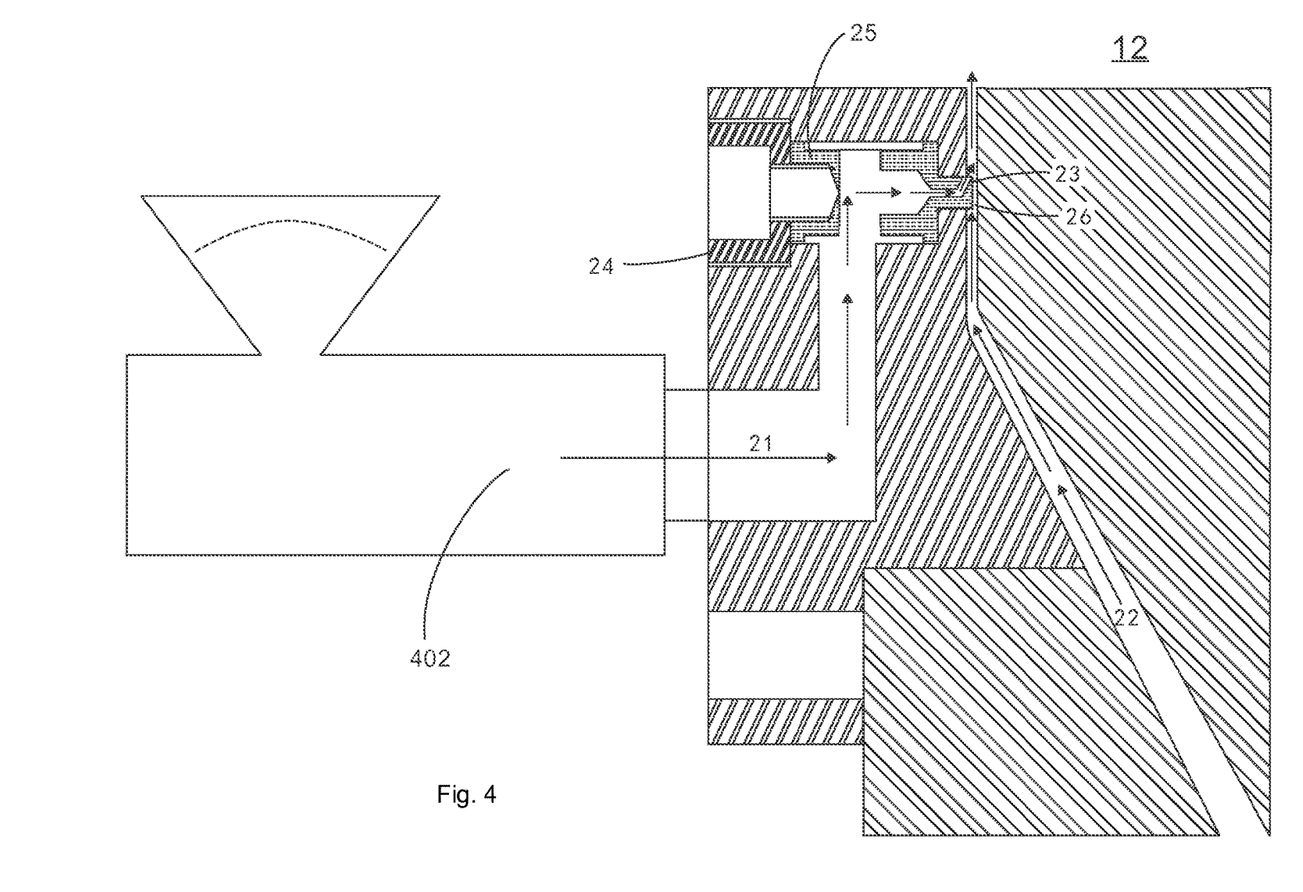
FIG. 4 illustrates a cross-section view of an exemplary die consistent with the disclosed embodiments.

FIG. 4 illustrates a cross-section view of an exemplary die 12 consistent with the disclosed embodiments. As shown in FIG. 4, a first material 21 may be melted in an extruder 402. A second material 22 may pass through a channel 26. In certain embodiments, the material 21 and the material 22 are polymeric material. The material 21 may or may not be the same to the material 22. The molten material 21 may be extruded through an extruding member 23 to be disposed on the web 17 formed from the material 22. In certain embodiments, the extruding member 23 may be an injection nozzle. The extruding member 23 may also be any other appropriate structure.

The extruding member 23 may be disposed into the channel 26 to a predetermined depth. As shown in FIG. 4, the position of the extruding member 23 may be controlled by a first positioning member 25. In certain embodiments, the first positioning member 25 may be a transfer pin. The first positioning member 25 may also be any other appropriate structure. The first positioning member 25 may be subsequently controlled by a second positioning member 24. In certain embodiments, the second positioning member 24 may be a push screw. The second positioning member 24 may also be any other appropriate structure.

Figure 5:
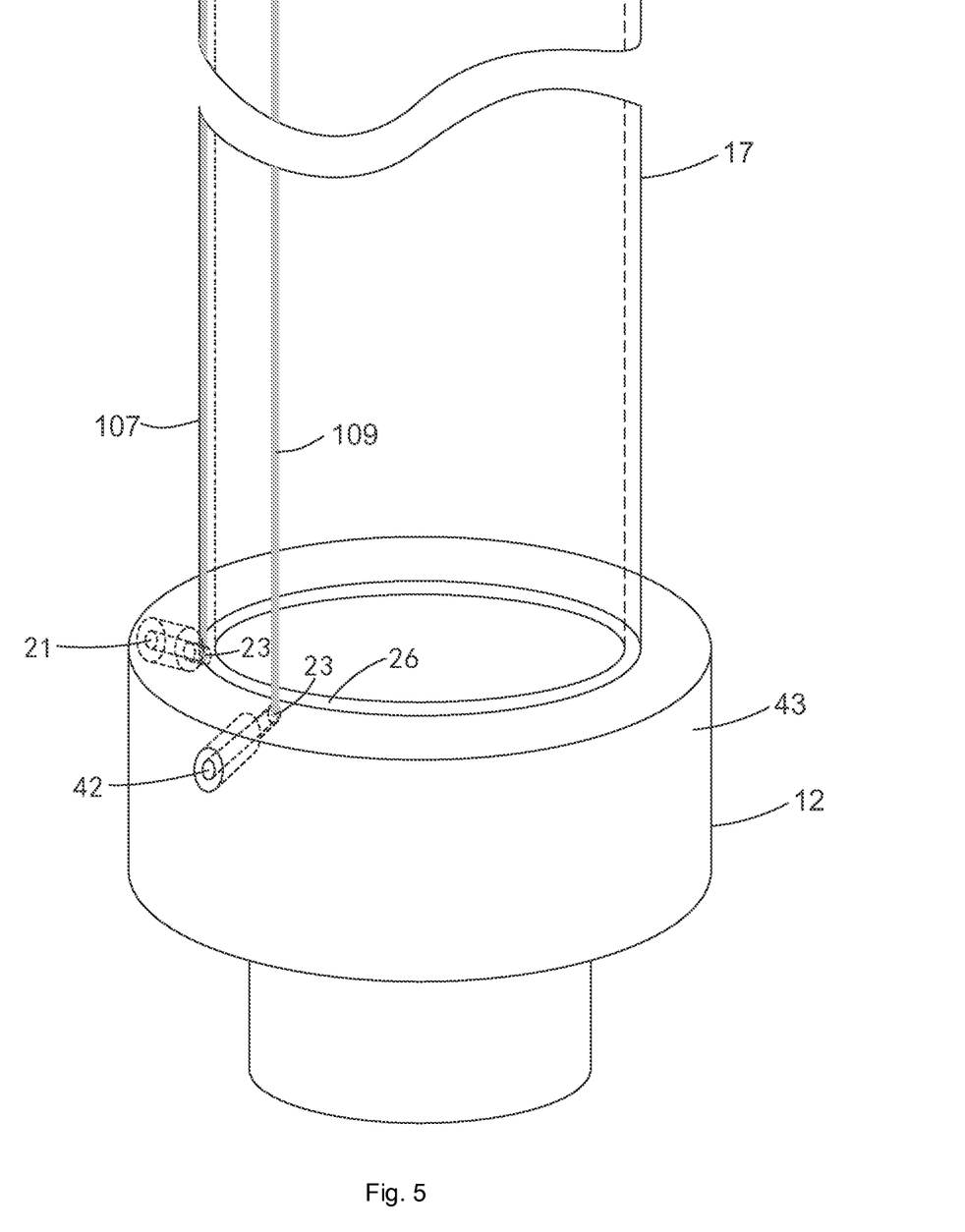
FIG. 5 illustrates an exemplary formation of an exemplary web with exemplary strips thereon from an exemplary die consistent with the disclosed embodiments.

FIG. 5 illustrates an exemplary formation of an exemplary web 17 with exemplary strips 107 and 109 thereon from the die 12. As shown in FIG. 5, in certain embodiments, the die 12 may have a circular surface 26. The die 12 may also have any other appropriate surface. The material 21 may be disposed on the web 17 to form the strip 107 through the extruding member 23. In addition, the die 12 may include additional extruding member 23 to dispose a third material 42 to form the strip 109. The material 42 may be same to the material 21. The material 42 may also be different to the material 21. After the web 17 collapses into the flat web 19, the strips 107 and 109 may be disposed at two sides of the flat web 19. Additional strips may be added to the web 17.

Figure 6:
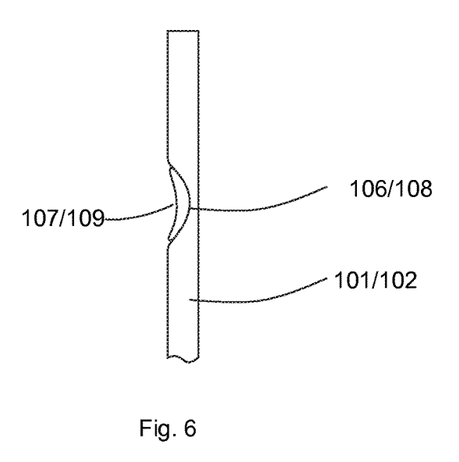
FIGS. 6-8 illustrate exemplary strips structure on the web consistent with the disclosed embodiments.
Figure 7:
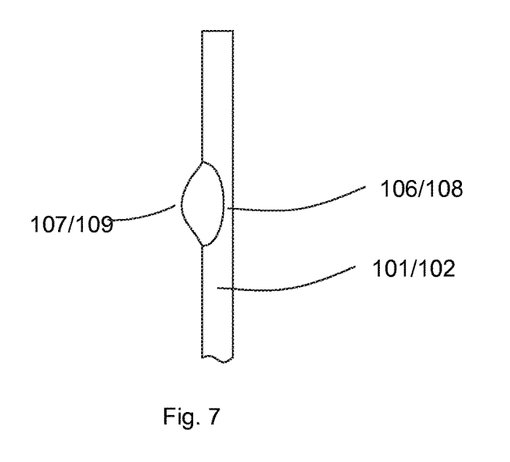
Figure 8:
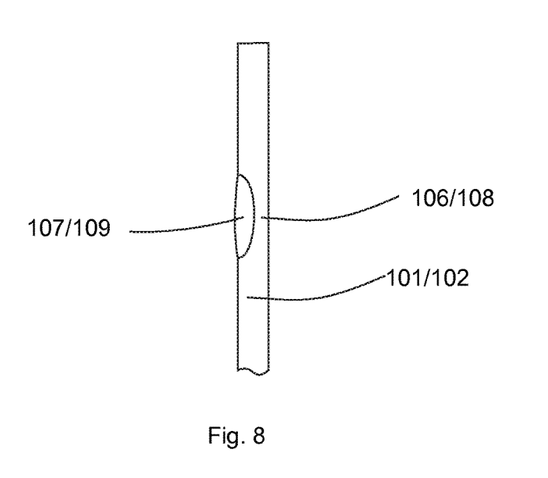

The shape of the strip 107 and the section 106 and the strip 109 and the section 108 may be controlled by controlling the amount of the material 21 and/or 42 and the positioning of the extruding member 23. FIGS. 6-8 illustrate exemplary strips structure on the web 17 consistent with the disclosed embodiments. As shown in FIG. 6, the extruding member 23 may penetrates in the channel 26 and may extrude a predetermined amount of material 21. The amount of the material 21 may be adjusted and determined empirically. As shown in FIG. 6, the amount of the material 21 may be sufficiently small so the strips 107/109 form an indention on the sections 106/108.

As shown in FIG. 7, the amount of the material 21 may be sufficiently large so the strips 107/109 form a bump on the section 106/108. As shown in FIG. 8, the material 21 may be controlled so the strips 107/109 on the section 106/108 may form a surface that is substantially even to the surface of the walls 101/102. The formation of even surface by the strips 107/109 may be achieved by controlling the penetration depth of the extruding member 23 and the amount of material 21 extruded. The penetration depth of the extruding member 23 may be controlled by adjusting the second positioning member 24.

The strength of the film and the easiness to tear the film open may depend on several factors. One factor is the type and/or the amount of material 21 on the strips 107/109. Similarly, the amount of the material 42 may also be a factor. The overall shape and structure of the strip as shown in FIGS. 6-8 may be another factor. The number and structure of the strips, the amount of the materials 21 and/or 42, the penetration depth of the extruding member 23 may be adjusted and determined empirically.

The type of the materials 21 and/or 42 may also affect the strength of the web 17 and the easiness to tear the film open. If the materials 21 and/or 42 are the same as the material 22 used in the web 17, the bonding between the strip materials 21 and/or 42 to the material 22 may be stronger. If the materials 21 and/or 42 are different to the material 22, for example, the materials 21 and/or 42 may be high density polyethylene or polypropylene and the material 22 may be low density polyethylene, the strength of the web 17 may be weaker. The materials used may be changed and may be determined empirically.

The thickness of the web 17 may be another factor to affect the strength of the web 17 and the easiness to tear the web 17 open. A thick web 17 usually has greater film strength. In certain embodiments, the web 17 may be substantially even as shown in FIG. 8. The strips 107/109 may be thicker if the thickness of the web 17 is increased. If the thickness of the web 17 is determined, the penetration depth of the extruding member 23 into the channel 26 may be adjusted to control the strength of the web 17 for the easy to tear feature.

Figure 9:
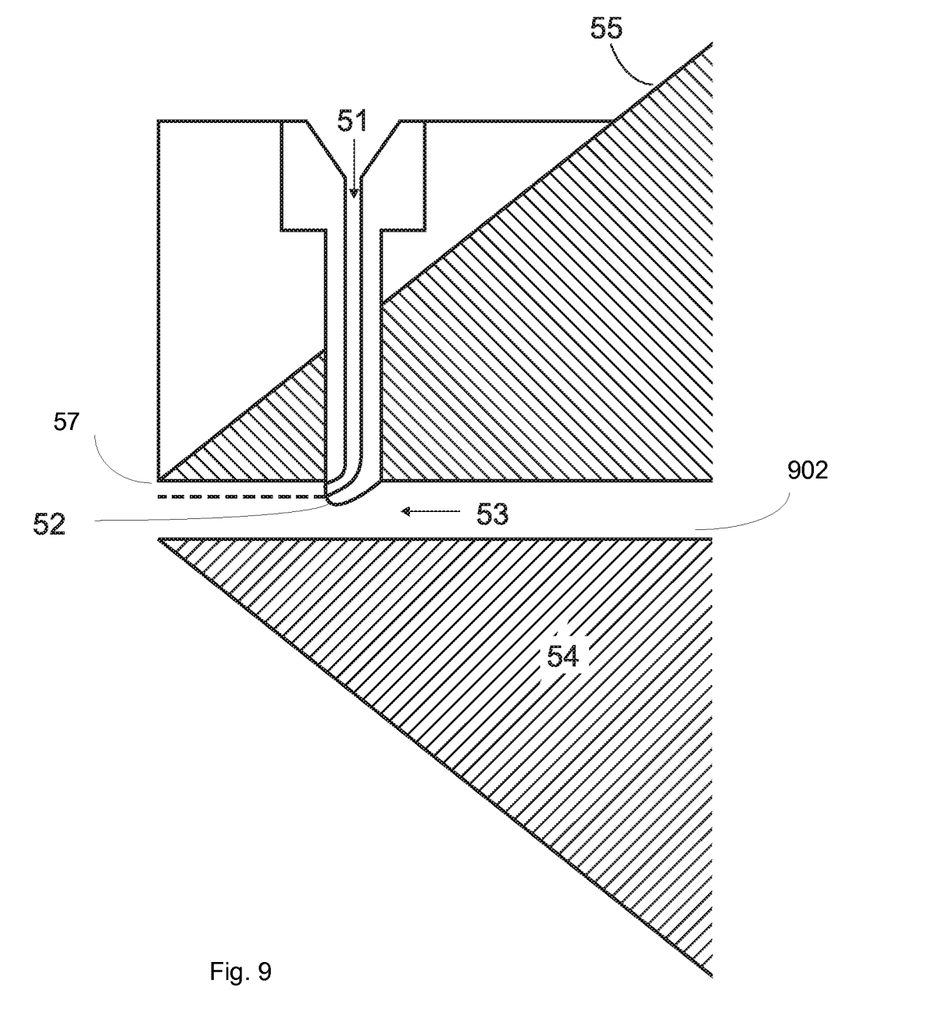
FIG. 9 illustrates a cross section view of an exemplary casting die consistent with the disclosed embodiments.

The strips on the film may also be introduced to the film by casting process. FIG. 9 illustrates a cross section view 54 of an exemplary casting die 55 consistent with the disclosed embodiments. As shown in FIG. 9, a film material 53 may pass through a channel 902. An extruding member 52 may dispose a strip material 51 on the film material 53 to form a strip 57. Similar to the extruding member 23, the extruding member 52 may be adjusted to control the formation of the strip 57. The strip 57 may be similar to the strip 107/109. The overall structure of the strip 57 and its corresponding section on the film may be similar to those shown in FIGS. 6-8. The materials 51 and 53 may be any appropriate material. In certain embodiments, the materials 51 and 53 may be polymeric materials, such as polyethylene. The material 51 may or may not be the same to the material 53.

Figure 10:
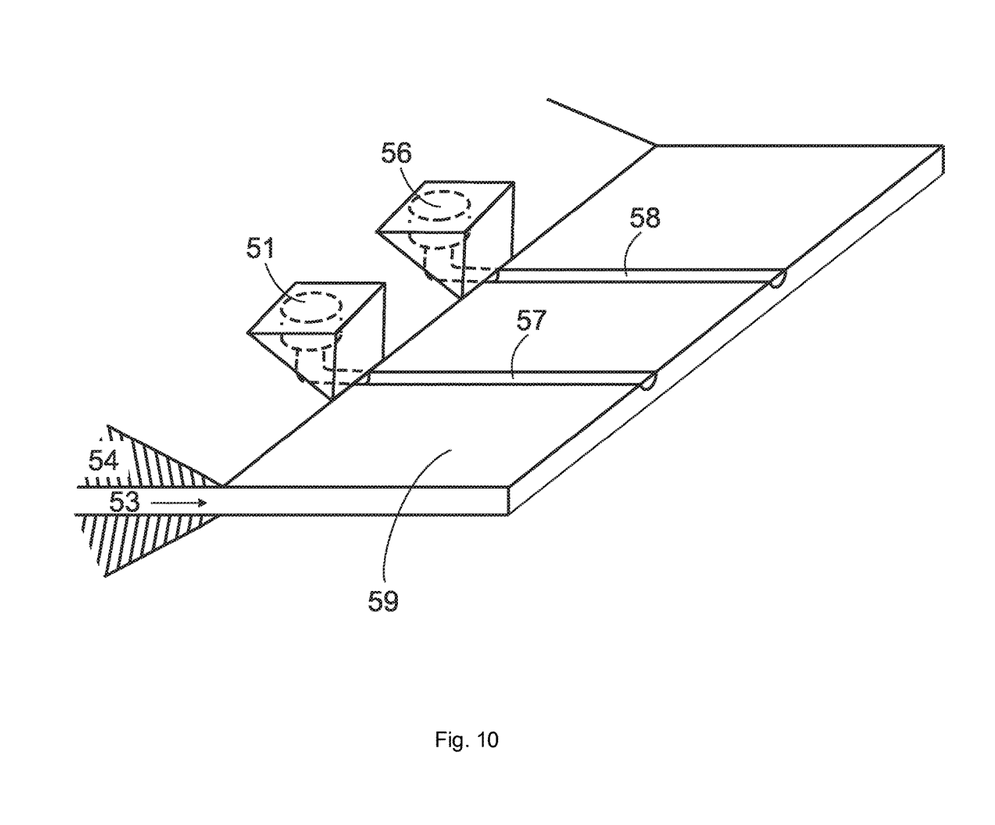
FIG. 10 illustrates a front view of an exemplary formation of a film 59 consistent with the disclosed embodiments.

FIG. 10 illustrates a front view of an exemplary formation of a film 59 consistent with the disclosed embodiments. As shown in FIG. 10, the film 59 may be formed from the material 53. The material 51 may be disposed on the film 59 to form a strip 57. An additional extruding member may dispose a material 56 to form a strip 58. The material 56 may be any appropriate material. In certain embodiments, the material 56 may be a polymeric material. The material 56 may or may not be the same as the materials 51 and/or 53.

The strength and the easiness to tear feature of the film 59 may be adjusted similarly as the web 17. The strips 57/58 may be similar to the strips 107/109. The materials used for the film 59, for the strips 57 and/or 58, and the thickness of the film 59 may be adjusted and determined empirically.

Figure 11:
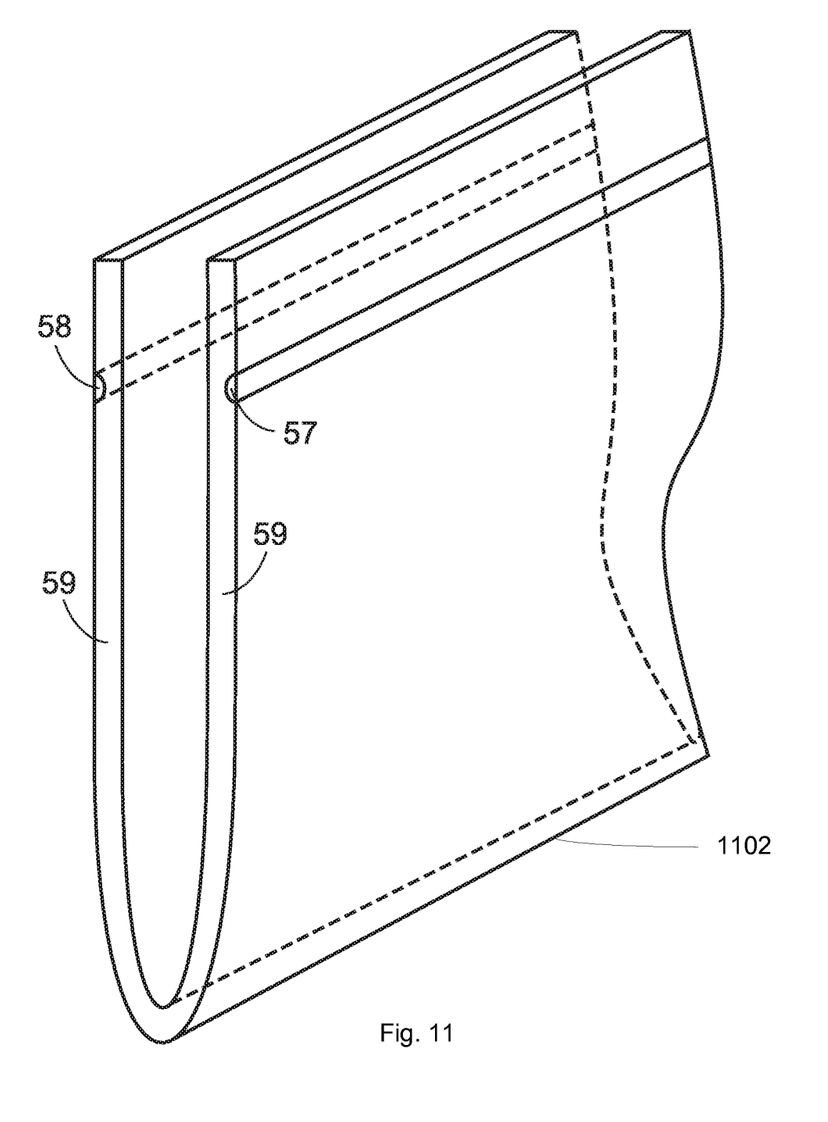
FIG. 11 illustrates an exemplary web consistent with the disclosed embodiments.

FIG. 11 illustrates an exemplary web 1102 consistent with the disclosed embodiments. As shown FIG. 11, the film 59 may be fold into a collapsed two walls web 1102 with the strips 57 and 58 on each wall. The web 1102 may be then sealed into a bag. In certain embodiments, the strips 57/58 may be located on the outside of the web 1102. The strips 57/58 may also be located on the inside of the web 1102.

Figure 12:
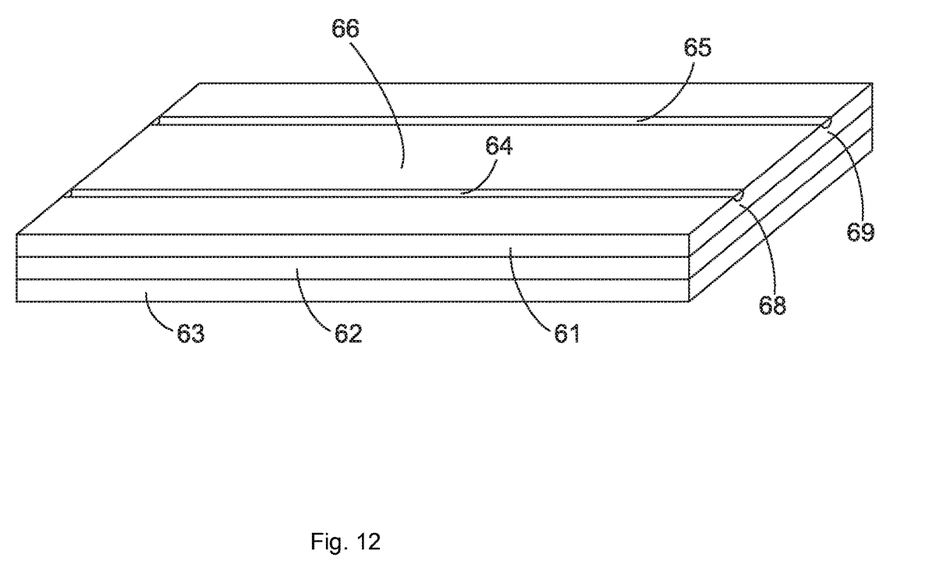
FIG. 12 illustrates an exemplary laminated film consistent with the disclosed embodiments.

FIG. 12 illustrates an exemplary laminated film 66 consistent with the disclosed embodiments. As shown in FIG. 12, the laminated film 66 may include a film 61, an adhesive layer 62, and a base film 63. The film 61 may be similar to the film 59 with strips 64 and/or 65. The strips 64 and/or 65 may be similar to the strips 57 and/or 58, respectively. Corresponding to the strips 64 and/or 65, thin section 68 and/or 69 may form on the film 61. The adhesive layer 63 may be made of any appropriate adhesive material to attach the film 61 to the base film 63. The base film 63 may be made of any appropriate materials. In certain embodiments, the base film 63 may be made of polymeric materials. The material for making the base film 63 may or may not be the same to that for making the film 61.

Figure 13:
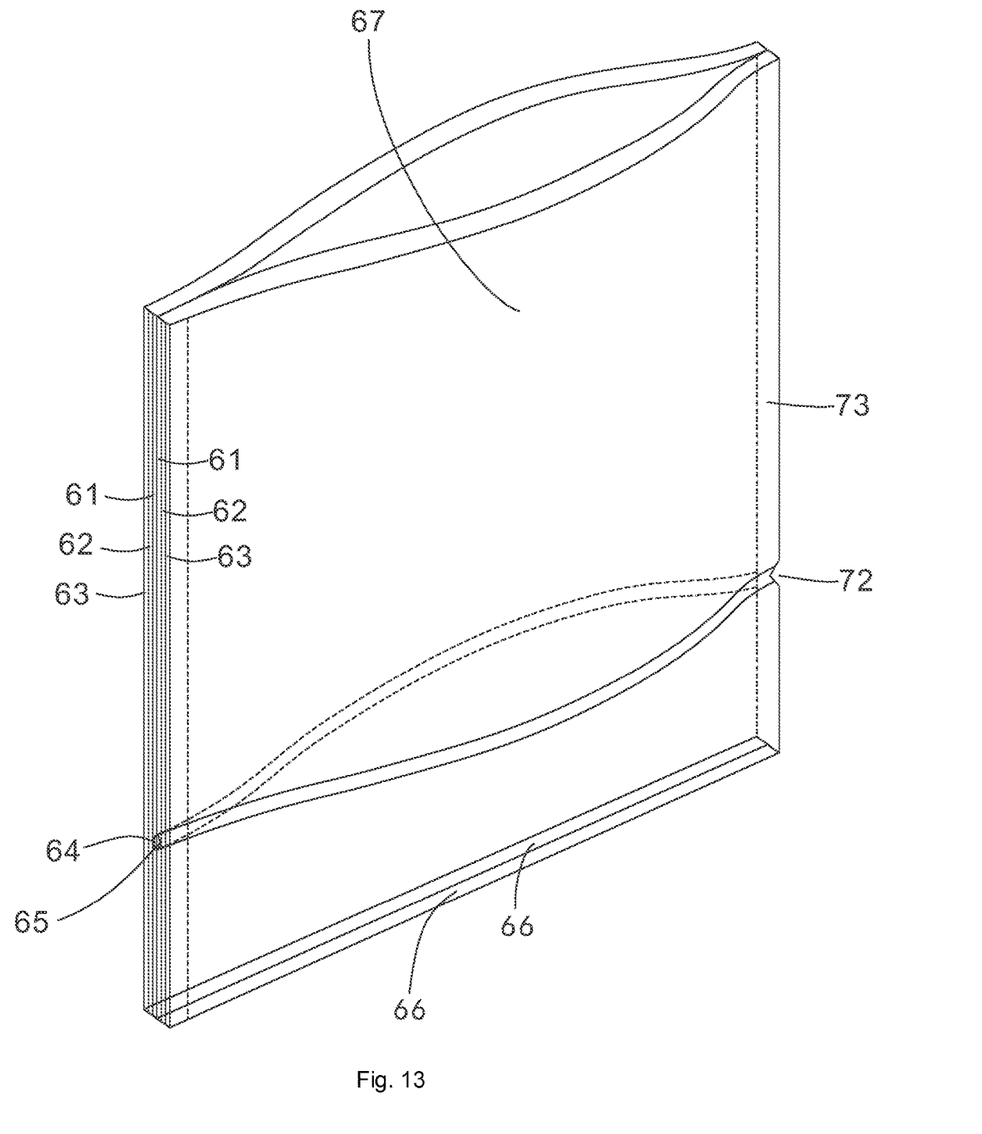
FIG. 13 illustrates an exemplary bag consistent with the disclosed embodiments.

FIG. 13 illustrates an exemplary bag 67 consistent with the disclosed embodiments. As shown in FIG. 13, the laminated bag 67 may be made of a film 66 with tear strips 64 and 65. The film 66 may be folded to form the walls of the bag 67. In certain embodiments, the strips 64 and 65 may align with each other. The strips 64 and 65 may also be disposed at any appropriate locations. The bag 67 may be torn open along the string 64 and 65.

Similar to the string 107/109 and the corresponding section 106/108, a weakened zone may be formed under the strings 64/65. A notch or a cut 72 may be disposed on an edge 73 of the bag 67 to mark the weakened zone. The notch 72 may align with the string 64 and/or 65. Thus, when a force is applied to the notch 72 and/or strings 64 and/or 65 of the bag 67, the bag 67 may be torn open at the notch 72 and the breakage may propagate along the strings 64 and/or 65. In certain embodiments, the film 63 is outside and the film 61 may be inside. The film 63 may also be inside and the film 61 may be outside.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications. For example, the number, location and shape of the strip may be adjusted.

What is claimed is:

1. A plastic bag, comprising:
a first wall made of a first material with a first thickness;
a second wall made of the first material with a second thickness, wherein an opening is formed on a first side of the first wall and the second wall and a second side of the first wall and the second wall is sealed together;
a first section on the first wall having a thickness, less than adjacent sections of the first wall and forming a first trench parallel to the opening; and
a first strip of a second material with a third thickness disposed at the first section on the first wall, the first strip having a compliment shape that fills the first trench;
wherein:
the first strip is attached to the first section by a bonding force weaker than a force within the first material of the first wall, and
the first strip and the first section align to form a first weakened zone.

2. The plastic bag according to claim 1, further including:
a second section on the second wall having a thickness, less than adjacent sections of the second wall and forming a second trench parallel to the opening; and
a second strip made of a third material with a fifth thickness disposed at the second section on the second wall, the second strip having a compliment shape that fills the second trench;
wherein
the second strip is attached to the second section by a bonding force weaker than a force within the second material of the second wall, and
the second strip and the second section align to form a second weakened zone.

3. The plastic bag according to claim 2, wherein:
the first weakened zone aligns with the second weakened zone.

4. The plastic bag according to claim 1, wherein:
the first strip is in different color to the first wall.

5. The plastic bag according to claim 1, wherein:
the first material is the same to the second material.

6. The plastic bag according to claim 1, wherein:
the first thickness dimension is substantially equal to the sum of the third thickness dimension and the fourth thickness dimension.

7. The plastic bag according to claim 1, further including:
an adhesive film; and
a base film.

8. The plastic bag according to claim 1, further including:
a male zipper profile;
a female zipper profile; wherein:
the male zipper profile and the female zipper profile form a zipper on the bag.

9. The plastic bag according to claim 1, wherein:
more than one first strip and first section are disposed on the first wall.

10. The plastic bag according to claim 1, wherein:
when the bag is being opened, the first strip is delaminated from the first wall, leaving the first section exposed, and a breakage happens in the first section and propagates along the first weakened zone.

11. The plastic bag according to claim 1, wherein:
the first strip on the first section forms an indentation from a surface of first wall.

12. The plastic bag according to claim 1, wherein:
the first strip on the first section forms a bump on a surface of first wall.

* * * * *